United States Patent [19]

Flesch

[11] 3,895,038

[45] July 15, 1975

[54] PHTHALIC ANHYDRIDE PROCESS

[75] Inventor: Wilhelm Flesch, Heidelberg, Germany

[73] Assignee: BASF Aktiengesellschaft, Ludwigshafen, Germany

[22] Filed: Jan. 22, 1973

[21] Appl. No.: 325,599

[52] U.S. Cl. .......................... 260/346.7; 260/515 P
[51] Int. Cl. ............................................. C07c 63/18
[58] Field of Search ...................... 260/515 P, 346.7

[56] References Cited
UNITED STATES PATENTS

| | | | |
|---|---|---|---|
| 1,851,383 | 3/1932 | Daniels | 260/346.7 |
| 2,064,468 | 12/1936 | Foster | 260/346.7 |
| 2,076,033 | 4/1937 | Kniskern | 260/346.7 |

Primary Examiner—James A. Patten
Attorney, Agent, or Firm—Bernhard R. Swick; Joseph D. Michaels; Robert E. Dunn

[57] ABSTRACT

In the process for removing phthalic anhydride and/or maleic anhydride from a waste or off-gas stream by passing the gas through a water scrubbing unit, the improvement which comprises the addition of ammonia or ammonium hydroxide to the water so as to neutralize the first acid group of the anhydride whereby the anhydride is rendered more water-soluble and plugging of the scrubber due to the precipitation or crystallization of the anhydride is avoided.

3 Claims, No Drawings

3,895,038

PHTHALIC ANHYDRIDE PROCESS

BACKGROUND

1. Field of the Invention

This invention relates to improvements in the method of recovering residual phthalic and/or maleic anhydride from off- or waste-gas streams so as to reduce atmospheric pollution.

2. Description of the Prior Art

In the manufacture of phthalic anhydride by vapor phase oxidation of aromatics, it is a well-known and standard procedure to use switch condensers to recover the resulting phthalic anhydride. Additional amounts of phthalic anhydride and/or its companion maleic anhydride have been recovered from the switch condenser off-gas stream by the use of a water wash. The water wash is necessary to reduce the amount of organic acid material discharged to the air. If the wash water containing the anhydrides is recycled so as to reduce the volume of water being handled, there is a buildup of total anhydride content in the scrub system followed by an undesirable precipitation of the anhydride which results in clogging of the scrubbing equipment.

U.S. Pat. No. 2,190,001 suggests that the formation of incrustations and lumps of substantial size can be avoided by the addition of the wetting agent to the scrub water. Several wetting agents are taught to be alkyl naphthalene sulfonic acids, sulfonic acids of formaldehyde phenol condensation products, sulfated higher fatty acids and the like. However, with the growing concern for the ecological balance of the environment, the use of sulfur containing wetting agents in scrub water which is subsequently incinerated is not desirable. Furthermore, these materials do not necessarily represent the most desirable economical factors.

In the interest of ecology it was proposed to directly incinerate the exit gas stream so as to remove the residual organic material from the atmosphere, however, this is an inherently dangerous process fraught with many fire and explosion hazards. The proposal to remove the organics by water scrubbing the exit gases lead to a large volume of water being incinerated which is quite expensive. It was then proposed to reduce the volume of water being incinerated by recycling the scrub water but due to the low solubility of phthalic anhydride and maleic anhydride in the water, the saturation point is quickly reached. Thereafter, incrustation and clogging of the scrubbing unit equipment is caused by the precipitation and crystallization out of phthalic anhydride and/or maleic anhydride.

SUMMARY OF THE INVENTION

In accordance with this invention, there is provided an improvement in the process for removing phthalic anhydride and maleic anhydride from a waste or off-gas stream from a vapor phase air oxidation in a catalytic bed phthalic anhydride process by passing said gas through a water scrubbing unit, the improvement comprising the addition of ammonia or ammonium hydroxide to the scrub water so as to substantially neutralize the first acid group of the said anhydrides whereby the anhydrides are rendered more water-soluble and plugging of the scrubbing unit by precipitation and/or crystallization of said anhydrides is avoided.

DESCRIPTION OF THE PREFERRED EMBODIMENT

The water solubility of the maleic anhydride and phthalic anhydride is greatly increased by ammoniating the first carboxylic group. Naturally, the amount of ammonia to be used depends upon the amount of anhydride present in the scrub water which in turn depends upon the amount of carry-over from the switch condensers, rate of scrub water bleed off, and so forth. It has been found that neutralization of only the first carboxyl group of the anhydride will be achieved by maintaining the scrub water at a pH from about 3.5 to 4. Depending upon availability of handling equipment, the ammonia can be added to the wash water as required, either as gaseous or liquid ammonia or as ammonium hydroxide.

The addition of the ammonia substantially increases a solubility of the phthalic and maleic anhydride molecules in the scrub water. The greater the amount of anhydride contained in the scrub water before precipitation, etc., in turn, means that smaller amounts of scrub water must be bled off to the incinerator for the same volume of off-gases. Incineration of the monoamide molecule results in combustion products which are normally and naturally found in the atmosphere and, thus, no pollution of the atmosphere is encountered.

In contrast to the use of ammonia or ammonium hydroxide, the other industrially available hydroxides, that is, the alkali metal and alkaline earth metal hydroxides of columns 1 and 2 of the periodic table are very undesirable. Sodium hydroxide is particularly readily available and typifies the problems of these hydroxides. In burning the monosodium salt contained in the scrub water, the sodium attacks the firebrick lining of the incinerator and has a very deleterious effect. The second large drawback is that sodium also is exhausted to the air as part of the spent gases, etc., and this injection into the air produces an undesirable pollution.

There is yet another advantage in the use of ammoniated wash water and that is the fuel, i.e., BTU's, requirements to incinerate the ammoniated scrub water is about one-third of the fuel requirements for incinerating the nonammoniated scrub water.

Still another advantage in the use of ammoniated wash water is the transformation of $SO_2$ and $SO_3$ in the off-gas into the corresponding ammonium salts thereby eliminating yet another undesirable air pollutant.

A commercial facility for the production of phthalic anhydride by vapor phase air oxidation in a catalytic bed and in which the phthalic anhydride is removed from the reaction product gas by passing the hot product gas first through liquid condensers and thence through switch solid condensers and thereafter by wash water scrubber was used in the following tests. No changes were made in the operating conditions of the process except in the scrubber unit as noted.

|  | Control | Invention |
|---|---|---|
| Ammonia injected into scrubber, Kg/hr | 0 | 90 |
| pH | 1–2 | 3.5–4 |
| Waste air (or off-gas) passing scrubber, $M^3$/hr | 200,000 | 200,000 |
| Phthalic anhydride washed out in scrubber, Kg/hr | 120 | 120 |

-Continued

|  | Control | Invention |
| --- | --- | --- |
| Maleic anhydride washed out in scrubber, kg/hr | 480 | 480 |
| Total pressure in scrubber after start-up, mm of Hg | 300 | 300 |
| Total pressure in scrubber after 1 day, mm of Hg | 1,000[1] | 300 |
| Total pressure in scrubber after 2 months, mm of Hg | Not operable | 300 |
| Waste water to incinerator, M³/hr | 4 | 4 |

[1]Pressure of this magnitude makes shutdown necessary to clean scrubber.

Similar results are obtained when the unit is operated at other rates of off-gas throughput or with ammonium hydroxide rather than ammonia. From the foregoing data it is readily apparent that a great advantage is obtained in the operation of the scrubber unit with small amounts of ammonia added.

The foregoing examples and methods have been described in the foregoing specification for the purpose of illustration and not limitation. Many other modifications and ramifications will naturally suggest themselves to those skilled in the art based on this disclosure. These are intended to be comprehended as within the scope of this invention.

The embodiments of the invention in which an exclusive property or privilege is claimed are defined as follows:

1. In the process for removing phthalic anhydride and maleic anhydride from a waste gas stream from a vapor phase air oxidation in a catalytic bed phthalic anhydride process by passing said gas through a water scrubbing unit to absorb in the water said anhydrides and thereafter incinerate without deleterious effect to the incinerator firebrick said anhydride containing water and discharging the resulting incineration products into the atmosphere, the improvement comprising the addition of ammonia or ammonium hydroxide to the scrub water so as to substantially neutralize only the first acid group of said anhydrides whereby said anhydrides are rendered more water-soluble and plugging of said scrubbing unit by precipitation and/or crystallization of said anhydrides is avoided.

2. The process according to claim 1 wherein the pH of the scrub water is about 3.5 to about 4.

3. The process according to claim 1 wherein ammonia is used.

* * * * *